(No Model.)
W. R. PATTERSON.
LIGHTNING ARRESTER FOR ELECTRIC WIRES.
No. 281,723. Patented July 24, 1883.
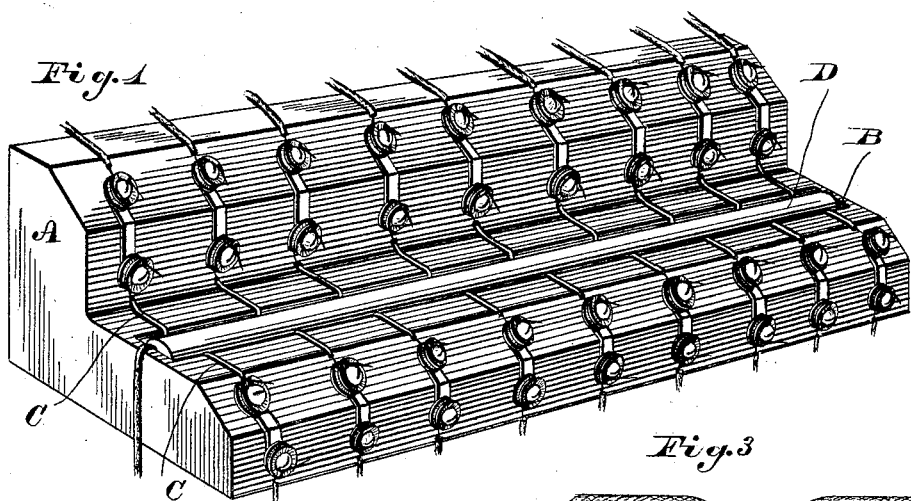
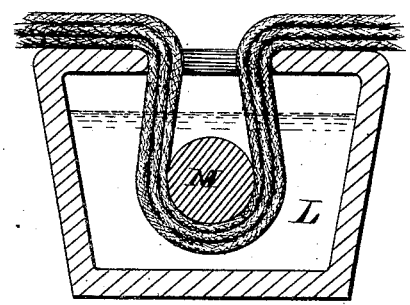
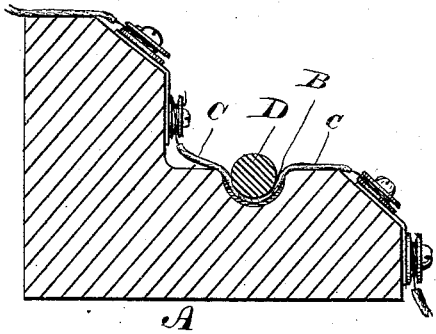
Attest
Paul A. Staley
M. L. Raftree
Inventor
William R. Patterson
By George F. Barton
Attorney

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

LIGHTNING-ARRESTER FOR ELECTRIC WIRES.

SPECIFICATION forming part of Letters Patent No. 281,723, dated July 24, 1883.

Application filed March 13, 1883. (No model.)

*To all whom it may concern:*

Be it known that I, WILLIAM R. PATTERSON, a citizen of the United States, residing at Chicago, in the county of Cook and State of Illinois, have invented a certain new and useful Improvement in Lightning-Arresters for Electric Wires, of which the following is a full, clear, concise, and exact description, reference being had to the accompanying drawings, forming a part of this specification.

My improvements relate to lightning-arresters; and it consists in a vessel or receptacle of mercury through which the wires are run, the portions of the wires passing through the mercury being insulated. Prior to my invention it was common to wind the insulated wires around a brass rod, which served as the ground-connection. In thus doing only part of the surface of a wire is in contact with the ground-connection, and therefore it is necessary to wind the wire several times around the rod. Another and more serious objection to this form of lightning-arrester is found in the fact that moisture is liable to gather upon the wire, and thus impair the insulation between the wire, and the rod, permitting more or less leakage.

A clamp has been used about the insulated wire, as described in Patent No. 248,825, to L. T. Young, dated October 25, 1881. This device is objectionable on account of the liability of moisture to collect between the block and the wire; and, further, in case a wire is burned out the opposing surface of the block or clamp is roughened; or the wire and block may be melted together, thus destroying or damaging the clamp.

By the use of my improvement the ground-connection completely surrounds the wire, and the character of mercury excludes all moisture from the wire thus immersed, and in case the wire is melted the mercury is simply heated, so as to render a small portion thereof volatile.

My invention is illustrated in the accompanying drawings.

Figure 1 is a perspective view of my lightning-arrester, showing nine wires passing through mercury in a trough. Fig. 2 is a transverse section thereof. Fig. 3 illustrates a modified form of my device in which the wires are passed through mercury in a cup.

The block A may be of wood, rubber, or any non-conducting material. This block is provided with a trough or cavity, B, which contains mercury.

The portions C C of the wires which pass through the mercury are insulated, preferably, by first passing through a sponge saturated with shellac, and then winding thereon a single covering of fine silk. Any thin insulating covering may be used. The wires are then laid loosely over the cavity B, and then, by means of the weight D, preferably an iron rod, are plunged in the mercury, as shown. The wires may, however, be simply bent, so as to pass under the mercury. As shown in Fig. 3, the cup L is filled partially with mercury, and the wires C C are run under the pin M. Many wires may thus be connected with the lightning-arrester within a very small space.

The mercury may be connected with the ground in any suitable manner. When a wire is struck by lightning, the spark passes through the thin insulation of the immersed portion C to the mercury, and thence harmlessly to the ground. The damage is repaired by removing the piece C, which has been burned, and replacing it with a new piece.

Mercury being liquid, a damaged wire may be replaced by a new one without removing any of the mercury.

The iron filings heretofore used about the insulated wires, (see English Patent No. 12,959 of 1850,) are objectionable, since they do not exclude moisture as thoroughly as is desirable, and in case a wire is burned off it is necessary to remove the filings before the new wire can be laid in place.

Having thus described my invention, what I I claim as new, and desire to secure by Letters Patent, is—

1. The combination, for lightning-arrester purposes, of insulated electric wires with mercury in a receptacle, said mercury being connected with the ground.

2. The combination of suitably-insulated wires with an adequate covering of mercury contained in a trough, cavity, or vessel, and means for keeping the wires immersed in the mercury, said mercury being connected with the ground, substantially as and for the purpose specified.

3. The combination, with the insulated wires C C, the bath of mercury, and rod D, of a properly-constructed support for such lightning-arrester, wires lying in a bath of mercury, said mercury being connected with the ground, substantially as shown and described.

In witness whereof I have hereunto subscribed my name this 3d day of March, A. D. 1883.

WILLIAM R. PATTERSON.

Witnesses:
P. A. STALEY,
LOUIS SPAHN.